US011315291B1

(12) United States Patent
Armand et al.

(10) Patent No.: US 11,315,291 B1
(45) Date of Patent: Apr. 26, 2022

(54) SHINE VISUALIZATION

(71) Applicant: INTERNATIONAL BUSINESS MACHINES CORPORATION, Armonk, NY (US)

(72) Inventors: Cyril Armand, Castelnau le Lez (FR); Ivan Deleuze, Montpellier (FR); Olivier Boehler, Jacou (FR); Christophe Menichetti, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/162,041

(22) Filed: Jan. 29, 2021

(51) Int. Cl.
| *G06T 11/00* | (2006.01) |
| *G06T 5/20* | (2006.01) |
| *G06T 7/40* | (2017.01) |
| *G06T 7/90* | (2017.01) |
| *G06K 9/62* | (2022.01) |
| *G06F 3/01* | (2006.01) |

(52) U.S. Cl.
CPC ............ *G06T 11/001* (2013.01); *G06F 3/013* (2013.01); *G06K 9/62* (2013.01); *G06T 5/20* (2013.01); *G06T 7/40* (2013.01); *G06T 7/90* (2017.01)

(58) Field of Classification Search
CPC combination set(s) only.
See application file for complete search history.

(56) References Cited

U.S. PATENT DOCUMENTS

| 2004/0004731 A1* | 1/2004 | Itagaki ..................... H04N 1/60 358/1.9 |
| 2007/0269108 A1 | 11/2007 | Steinberg |
| 2013/0016102 A1 | 1/2013 | Look |
| 2015/0091903 A1 | 4/2015 | Costello |
| 2015/0358646 A1* | 12/2015 | Mertens .................. H04N 9/68 382/166 |
| 2019/0005710 A1* | 1/2019 | Irrgang ................... G06T 15/50 |
| 2019/0320133 A1 | 10/2019 | Kuplevakhsky |

OTHER PUBLICATIONS

Cohen et al., "View-based Rendering: Visualizing Real Objects from Scanned Range and Color Data," Springer-Verlag, Jan. 1997, Retrieved from the Internet: <https://www.microsoft.com/en-us/research/publication/view-based-rendering-visualizing-real-objects-from-scanned-range-and-color-data/>, 15 pages.

Mell et al., "The NIST Definition of Cloud Computing", National Institute of Standards and Technology, Special Publication 800-145, Sep. 2011, 7 pages.

* cited by examiner

*Primary Examiner* — Wesner Sajous
(74) *Attorney, Agent, or Firm* — Rakesh Roy

(57) ABSTRACT

A method, computer system, and a computer program product for shine visualization is provided. The present invention may include recognizing an object in a digital image loaded on a user device. The present invention may include assigning a shine index to the recognized object. The present invention may include determining, based on a plurality of pixel values corresponding to the recognized object, a direction of light relative to the recognized object. The present invention may include tracking a position of a user's eyes viewing the digital image on the user device. The present invention may include in response to detecting a movement in the position of the user's eyes, applying, in real-time, at least one filter to the recognized object to simulate a shining effect of the recognized object in the digital image.

20 Claims, 12 Drawing Sheets

SHINE VISUALIZATION

BACKGROUND

The present invention relates generally to the field of computing, and more particularly to digital image processing.

A color may include a matte finish or have various levels of shine. Such effects on a color may have a direct impact on the way a human eye will see the color. For example, a color with a matte finish may appear flat. However, the appearance of the same color with a shiny finish may produce more variations in color as it will reflect more light. This difference may be easy to see in a video or in a moving three-dimensional image because a shiny color may variate as a function of the camera or eye position.

SUMMARY

Embodiments of the present invention disclose a method, computer system, and a computer program product for shine visualization. The present invention may include recognizing an object in a digital image loaded on a user device. The present invention may include assigning a shine index to the recognized object. The present invention may include determining, based on a plurality of pixel values corresponding to the recognized object, a direction of light relative to the recognized object. The present invention may include tracking a position of a user's eyes viewing the digital image on the user device. The present invention may include in response to detecting a movement in the position of the user's eyes, applying, in real-time, at least one filter to the recognized object to simulate a shining effect of the recognized object in the digital image.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
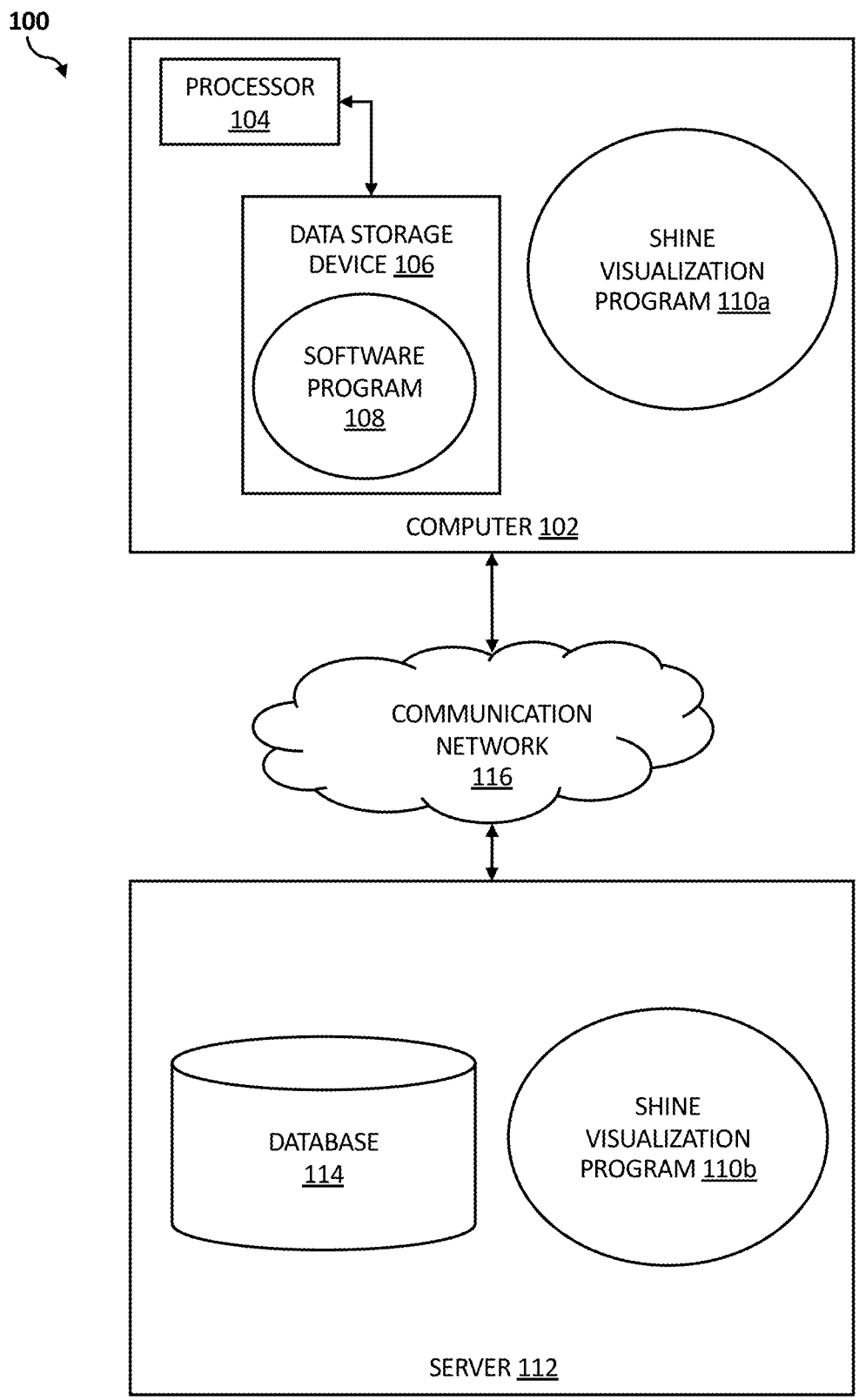
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for shine visualization. As such, the present embodiment has the capacity to improve the technical field of digital image processing by visualizing shining objects in static digital images. More specifically, a shine visualization program may recognize an object in a digital image and determine an associated shine index corresponding to the recognized object. Then, in response to the determined shine index meeting a threshold shine index, the shine visualization program may extract pixel values of a plurality of pixels associated with the recognized object in the digital image. Next, the shine visualization program may detect any variations in the extracted pixel values of the plurality of pixels associated with the recognized object, where the detected variation in the extracted pixel values may be associated with light reflecting from the recognized object in the digital image. Then, the shine visualization program may determine, based on the detected variation in the extracted color values, a light source position relative to the recognized object in the digital image. Next, the shine visualization program may track a position of a user's eyes viewing the digital image on a user device. Thereafter, in response to detecting a movement in the position of the user's eyes, the shine visualization program may apply a filter to a subset of the plurality of pixels of the recognized object to simulate a shine effect on the recognized object in the digital image.

As described previously, a color may include a matte finish or have various levels of shine. Such effects on a color may have a direct impact on the way a human eye will see the color. For example, a color with a matte finish may appear flat. However, the appearance of the same color with a shiny finish may produce more variations in color as it will reflect more light. This difference may be easy to see in a video or in a moving three-dimensional image because a shiny color may variate as a function of the camera or eye position. However, in a fixed digital image, the shinning effect of an object is impossible to see because the static nature of the medium.

Therefore, it may be advantageous to, among other things, provide a way to detect if a user viewing a digital image on a user device (with a camera) is moving and to simulate the shining effect of an object in the digital image if movement is detected. Accordingly, the disclosed embodiments may enhance user experience and provide more information to a user interacting with a digital image on a user device.

In real life, a viewer may observe the brightness of an object as a result of the viewer's position and the position of the sun or other source of light. According to at least one embodiment of the present disclosure, an extra level of data may be added to a static or fixed digital image to enable an image reader display the reflection of light on various shining objects in the image. In one embodiment, image recognition may be implemented to detect and recognize objects in a digital image. Based on the materials of the objects recognized in the image, a shine level or index may be assigned to each the objects. Objects that include a shine index which meet a threshold shine level may be further processed. In one embodiment, the further processing may include detecting variations in an object's color resulting from the reflection of the light to determine the direction of light relative to the objects in the digital image. According to one embodiment, when the image is displayed by the reader on the user device, the camera of the user device may track the movement of the user (e.g., based on the user's eye or gaze). If the user is stable, the reader may not make any changes to the image. However, if movement of the user or device is detected, the reader may apply one or more filters to the image to simulate a shining effect on various objects in the image. In one embodiment, if the user moves their head away from the light source, the reader may apply a filter to augment the brightness of the object to simulate the mirror effect with the light source. In another embodiment, if the user moves their head closer to the light source (e.g., between the light source and the object), the reader may apply a filter to decrease the brightness of the object.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a shine visualization program 110a. The networked computer environment 100 may also include a server 112 that is enabled to run a shine visualization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 10, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the shine visualization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the shine visualization program 110a, 110b (respectively) to animate a static digital image to simulate a shining effect on an image object. Embodiments of the present disclosure are explained in more detail below with respect to FIGS. 2 to 9.

Figure 2:
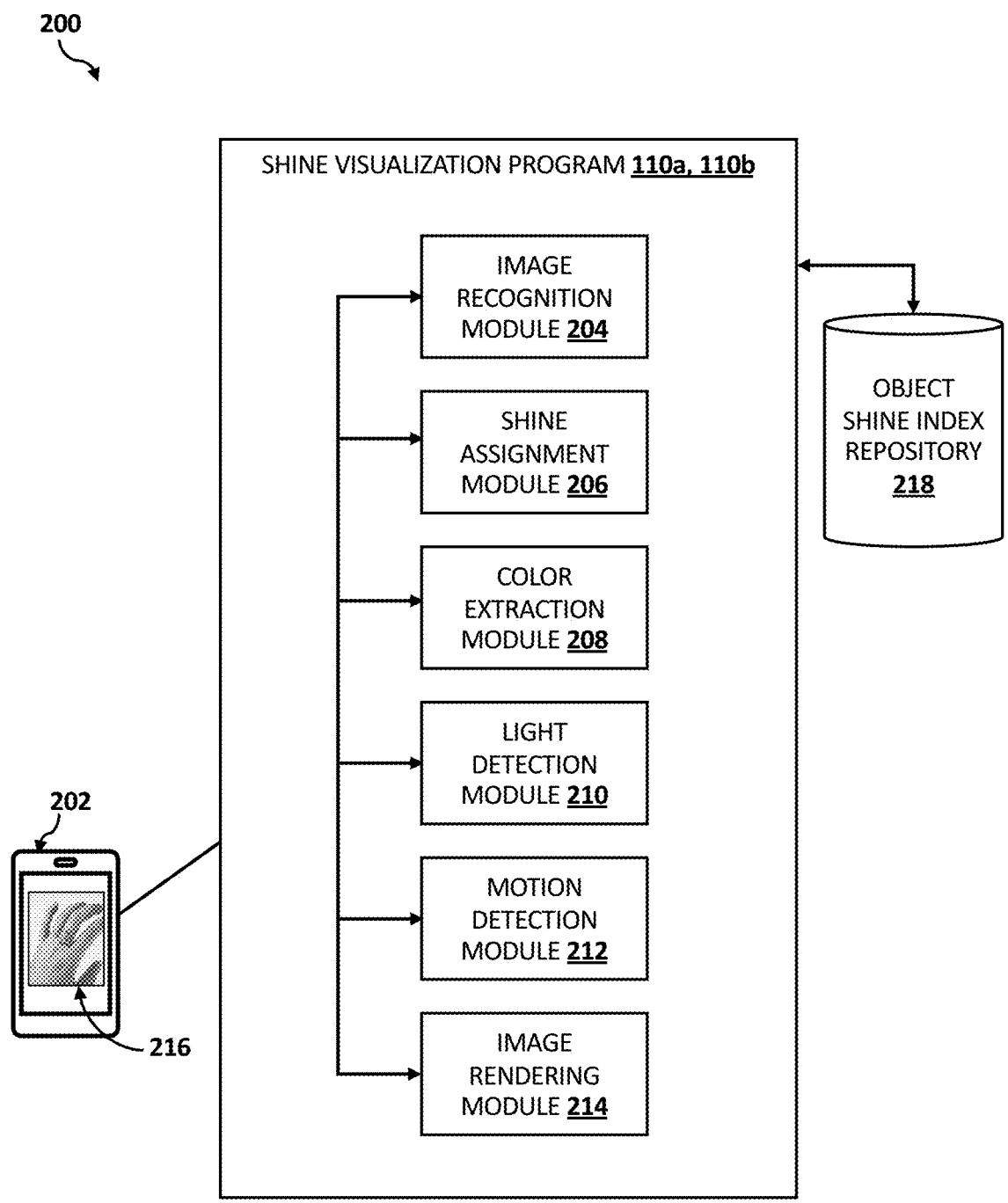
FIG. 2 is a schematic block diagram of a digital image processing environment according to at least one embodiment.

Referring now to FIG. 2, a schematic block diagram of a digital image processing environment 200 implementing the shine visualization program 110a, 110b according to at least one embodiment is depicted. According to one embodiment, the digital image processing environment 200 may include one or more components (e.g., client computer 102; server computer 112; communication network 116) of the computer environment 100 discussed above with reference to FIG. 1.

According to one embodiment, digital image processing environment 200 may include a camera-enabled computing device which may be referred to as a user device 202. In various embodiments, user device 202 may include a workstation, a personal computing device, a laptop computer, a desktop computer, a tablet computer, a smart telephone, or other suitable electronic devices. According to one embodiment, user device 202 may include a tangible storage device (e.g., data storage device 106) and a processor that is enabled to run the shine visualization program 110a, 110b.

In one embodiment, the shine visualization program 110a, 110b may include a single computer program or multiple program modules or sets of instructions being executed by the processor of user device 202. The shine visualization program 110a, 110b may include routines, objects, components, units, logic, data structures, and actions that may perform particular tasks or implement particular abstract data types. The shine visualization program 110a, 110b may be practiced in distributed cloud computing environments where tasks may be performed by remote processing devices which may be linked through the communication network 116. In one embodiment, the shine visualization program 110a, 110b may include program instructions that may be collectively stored on one or more computer-readable storage media. As shown in the illustrated embodiment, the shine visualization program 110a, 110b may include an image recognition module 204, a shine assignment module 206, a color extraction module 208, a light detection module 210, a motion detection module 212, and an image rendering module 214.

According to one embodiment, digital image processing environment 200 may include a digital image 216 (e.g., fixed or static digital image) loaded onto the user device 202. Examples file types for digital image 216 may include, for example, Joint Photographic Experts Group (JPEG), Portable Network Graphics (PNG), Raw Image Format (RAW), or any other suitable file type for storing fixed images. In one embodiment, the shine visualization program 110a, 110b may be implemented to simulate a shining effect on any object in digital image 216 which may have a natural tendency to shine based on the material and/or color of the object.

According to one embodiment, the shine visualization program 110a, 110b may implement the image recognition module 204 to detect, classify, or recognize any object captured in the digital image 216. In one embodiment, the image recognition module 204 may implement a trained machine learning model such as, for example, a trained convolutional neural network (CNN) to receive digital image 216 as an input layer and output, based on pixel features, a corresponding label for each detected or recognized object or element in the digital image 216. In various embodiments, the image recognition module 204 may also be enabled to determine a color and a surface material or feature for each recognized object. For example, the image recognition module 204 may recognize a lake as one object in digital image 216. In one embodiment, the image recognition module 204 may also indicate that the color of the lake is blue and the surface material of the lake is water.

According to one embodiment, the shine visualization program 110a, 110b may implement the shine assignment module 206 to assign a shine level or shine index to each object recognized by the image recognition module 204 in digital image 216. In at least one embodiment, the shine index of an object may be associated with the amount of light that the object may reflect (e.g., based on the color, material, and/or finish of the object). In one embodiment, the shine index may range from 0 to 1 where a shine index of 0 may indicate that the object does not reflect any light (e.g., painted wall with matte finish) and a shine index of 1 may indicate that the object is very shiny (e.g., mirror, gold, water). In other embodiments, the shine index may range from 0 to any number (e.g., 100). In some embodiments, the shine index range may be reversed such that a shine index of 0 may indicate the highest level of shine.

According to one embodiment, the digital image processing environment 200 may include an object shine index repository 218 which may store a corresponding shine index for various objects and materials which may be captured in digital image 216. In one embodiment, the shine assignment module 206 may communicate with the object shine index repository 218 to retrieve a shine index for each object recognized by the image recognition module 204.

According to one embodiment, if none of the shine indexes assigned to the objects recognized in digital image 216 meets a minimum shine index (e.g., threshold shine index), the shine visualization program 110a, 110b may display the digital image 216 as a static image. In one embodiment, if the shine indexes assigned to some of the objects recognized in digital image 216 meets the minimum shine index, the shine visualization program 110a, 110b may further process and animate the shine in those objects and display the other objects which did not meet the minimum shine index as-is. In one embodiment, any shine index above 0 may meet the minimum shine index requirement. In one embodiment, the shine visualization program 110a, 110b may include a default minimum shine index and may also enable the user to enter a user-defined minimum shine index.

According to one embodiment, the shine visualization program 110a, 110b may implement the color extraction module 208 and the light detection module 210 to determine a location of a light source and a direction of light captured in the digital image 216. In one embodiment, the direction of light may be determined by the color of an object since the color is directly related to the reflection of light. Even an object that is a solid or uniform color in reality, such as, for example, a red car, may be perceived as having variations in color based on the way the light falls on the car. In one embodiment, the variations in color may be indicated by a tonal value where the tonal value of a color may be changed by adding white, black, or gray to an original color. All colors may include a tonal value associated with the lightness or darkness of the color. In one embodiment, a high key tonal value of a color may indicate a lighter variation of the color and a low key tonal value of the color may indicate a darker variation of the color. In one embodiment, the color extraction module 208 may extract and compare the pixel values corresponding to the pixels of each object to detect variations in the object's color (e.g., tonal variations). In one embodiment, the color extraction module 208 may use the red, green, blue (RGB) additive color model to compare the pixel values. In other embodiments, the color extraction module 208 may also be enabled to use the hue, saturation, lightness (HSL) or hue, saturation, value (HSV) color models when comparing the pixel values.

According to one embodiment, the light detection module 210 may use the tonal variations in color measured by the color extraction module 208 to calculate one or more luminosity levels of the object. In one embodiment, the luminosity may refer to a measure of the amount of light falling on a surface of an object. In one embodiment, luminosity may indicate a relative value (e.g., relative luminosity) in a range from 0 to 1, 0 to 100, or any other suitable range, where a higher luminosity level associated with a surface may indicate more light falling on that surface. In various embodiments, the light detection module 210 may calculate multiple luminosity levels for each object, where a surface of the object which receives the most amount of light may include the highest luminosity level (e.g., 1) and the surface of the object which receives the least amount of light may include the lowest luminosity level (e.g., 0.2). According to one embodiment, the portions of the object that include relatively high key tonal values (e.g., lighter variation of the color), as determined by the color extraction module 208, may be determined to include relatively high luminosity levels by the light detection module 210. In one embodiment, luminosity levels calculated by the light detection module 210 may indicate a luminosity gradient from lightness to darkness (e.g., high relative luminosity to low relative luminosity). In various embodiments, the calculated luminosity gradient may indicate the location of the light source and the direction of light. More specifically, the light detection module 210 may determine that the location of the light source and the direction of the light is on the side of the object with the highest luminosity level.

According to one embodiment, the processes described above (e.g., recognizing objects, assigning shine index, and identifying direction of light) with reference to the image recognition module 204, shine assignment module 206, the color extraction module 208, and the light detection module 210 may be performed in real-time as soon as digital image 216 is loaded onto user device 202. The metadata generated by the above processes may be stored in the main memory of the user device 202 associated with shine visualization program 110a, 110b. In one embodiment, the motion detection module 212 and the image rendering module 214 may utilize the stored metadata to simulate a shining effect on one or more objects of the digital image 216, as will be further described below.

According to one embodiment, the shine visualization program 110a, 110b may implement the motion detection module 212 to interact with a camera of user device 202 to track any movements of a user viewing the digital image 216 on user device 202. In one embodiment, the motion detection module 212 may track either the movement of the user's head or the movement of the device since the position of the user's eye will be different relative to the camera in both instances. In at least one embodiment, the motion detection module 212 may track the movement of the user's eye relative to the location of the light source determined by the light detection module 210. According to one embodiment, if the motion detection module 212 determines that the user may be moving away from the location of the light source, the image rendering module 214 may be implemented to apply a filter in real-time to increase the brightness of the object to simulate an increased mirror effect with the light source. In at least one embodiment, the image rendering module 214 may apply any suitable filter (e.g., brightness filter, contrast filter, highlight filter, tonal value filter) to at least a subset of the pixels associated with the objects to simulate a shining effect. Similarly, if the motion detection module 212 determines that the user may be moving towards the location of the light source and/or between the light source and the object, the image rendering module 214 may be implemented to apply one or more filters in real-time to decrease the brightness of the object. According to one embodiment, the image rendering module 214 may use the shine index assigned to the object as a multiplier with the filter. Accordingly, the image rendering module 214 may apply the filters more intensively on objects having higher shine indexes.

Figure 3:
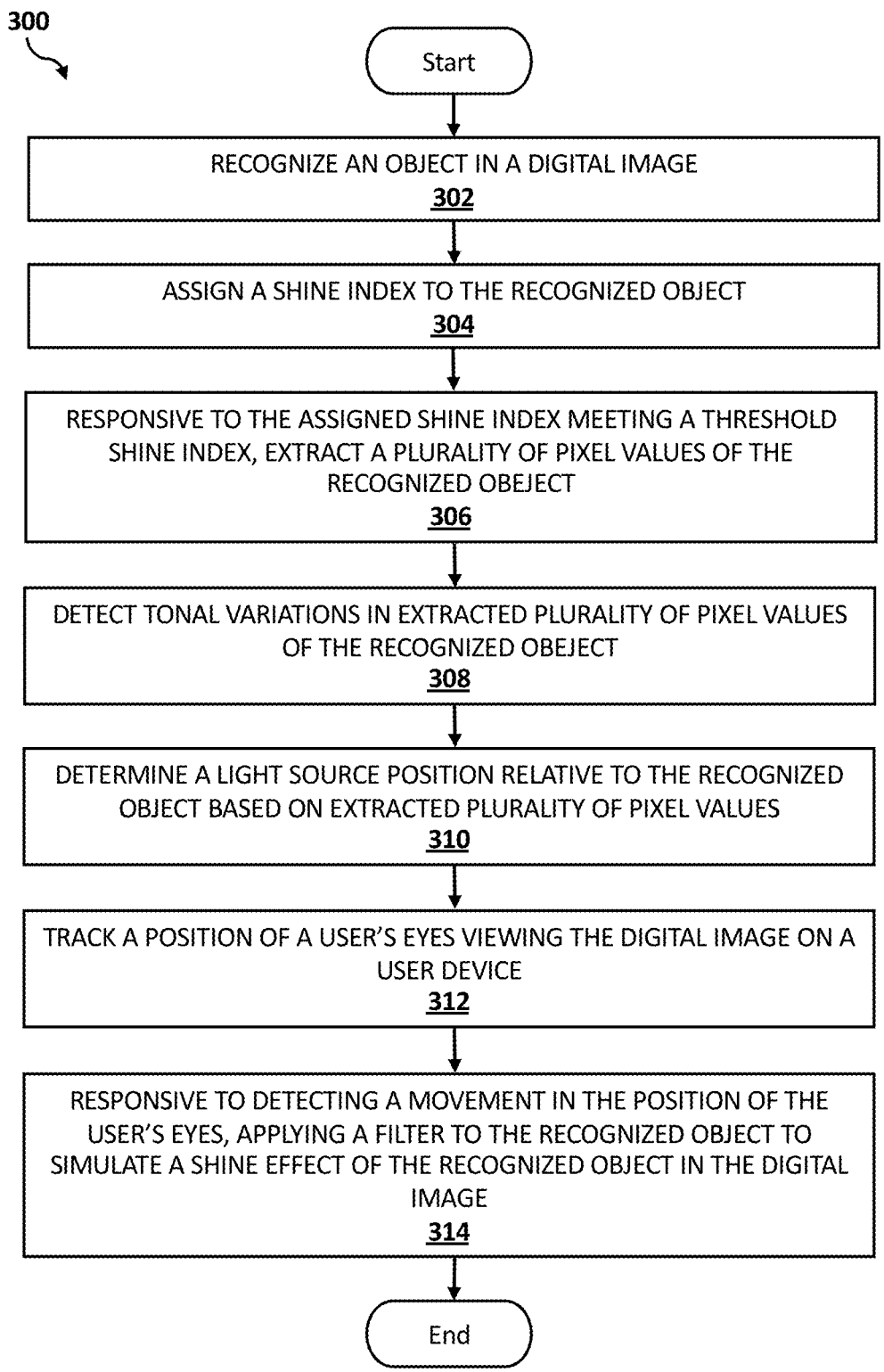
FIG. 3 is an operational flowchart illustrating a process for shine visualization according to at least one embodiment.

Referring now to FIG. 3, an operational flowchart illustrating the exemplary shine visualization process 300 used by the shine visualization program 110a, 110b according to at least one embodiment is depicted.

At 302, an object is recognized in a digital image. According to one embodiment, the image recognition module 204 of the shine visualization program 110a, 110b may implement image recognition capabilities, such as, for example, a trained CNN model to detect and recognize the various objects captured in a digital image loaded onto a user device.

Then at 304, a shine index is assigned to the recognized object. According to one embodiment, the shine assignment module 206 of the shine visualization program 110a, 110b may assign a shine index to each object recognized by the image recognition module 204 in the digital image. As described previously with reference to FIG. 2, the shine assignment module 206 may have access to the object shine index repository 218 which may store corresponding shine indexes for various objects and materials.

Then at 306, responsive to the assigned shine index meeting a threshold shine index, a plurality of pixel values of the recognized object are extracted. According to one embodiment, the shine visualization program 110a, 110b may implement the threshold shine index as a minimum shine index which must be met by the objects recognized in the digital image prior to further processing. As described previously with reference to FIG. 2, the shine visualization program 110a, 110b may include a default minimum shine index (e.g., default threshold shine index) and may also enable the user to enter a user-defined minimum shine index (e.g., user-defined threshold shine index). In one embodiment, the color extraction module 208 may extract and compare the pixel values corresponding to the pixels of each object, as described previously with reference to FIG. 2.

Then at 308, tonal variations in the extracted plurality of pixel values of the recognized object are detected. According to one embodiment, the color extraction module 208 may detect tonal variations by comparing pixel values using a color model, as described previously with reference to FIG. 2. Tonal variations in the color of an object may be a result of the amount of light reflecting from the object.

Then at 310, a position of a light source relative to the recognized object is determined based on the extracted plurality of pixel values. According to one embodiment, the light detection module 210 of the shine visualization program 110a, 110b may use the tonal variations in color measured by the color extraction module 208 to calculate one or more luminosity levels of the object. According to one embodiment, the portions of the object that include relatively high key tonal values (e.g., lighter variation of the color), as determined by the color extraction module 208, may be determined to include relatively high luminosity levels by the light detection module 210. In one embodiment, luminosity levels calculated by the light detection module 210 may indicate a luminosity gradient from lightness to darkness (e.g., high relative luminosity to low relative luminosity). In various embodiments, the luminosity gradient may indicate the location of the light source and the direction of the light. More specifically, the light detection module 210 may determine that the location of the light source and the direction of the light is on the side of the object with the highest luminosity level.

Then at 312, a user's eyes are tracked as the user is viewing the digital image on the user device. According to one embodiment, the motion detection module 212 of the shine visualization program 110a, 110b may interact with a camera of the user device to track any movements of a user viewing the digital image on the user device. In one embodiment, the motion detection module 212 may track either the movement of the user's head or the movement of the device since the position of the user's eye will be different relative to the camera in both instances. In at least one embodiment, the motion detection module 212 may also track the movement of the user's eye relative to the location of the light source determined by the light detection module 210 at 312.

Thereafter at 314, responsive to detecting a movement in the position of the user's eyes, one or more filters are applied to the recognized object to simulate a shine effect of the recognized object in the digital image. In one embodiment, the image rendering module 214 may apply various filters in real-time to increase or decrease the shining effect of the objects based on the movement of the user's eye. According to one embodiment, if the motion detection module 212 determines that the user may be moving away from the location of the light source, the image rendering module 214 may be implemented to apply one or more filters to increase the brightness of the object to simulate an increased mirror effect with the light source. In at least one embodiment, the image rendering module 214 may apply any suitable filter (e.g., brightness filter, contrast filter, highlight filter, tonal value filter) to at least a subset of the pixels associated with the objects to simulate a shining effect. Similarly, if the motion detection module 212 determines that the user may be moving towards the location of the light source and/or between the light source and the object, the image rendering module 214 may be implemented to apply one or more filters in real-time to decrease the brightness of the object. According to one embodiment, the image rendering module 214 may use the shine index assigned to the object as a multiplier with the filter. Accordingly, the image rendering module 214 may apply the filters more intensively on objects having higher shine indexes.

Referring now to FIGS. 4-9, block diagrams illustrating an example of the shine visualization process 300 of FIG. 3 used by the shine visualization program 110*a*, 110*b* according to at least one embodiment is depicted.

Figure 4:
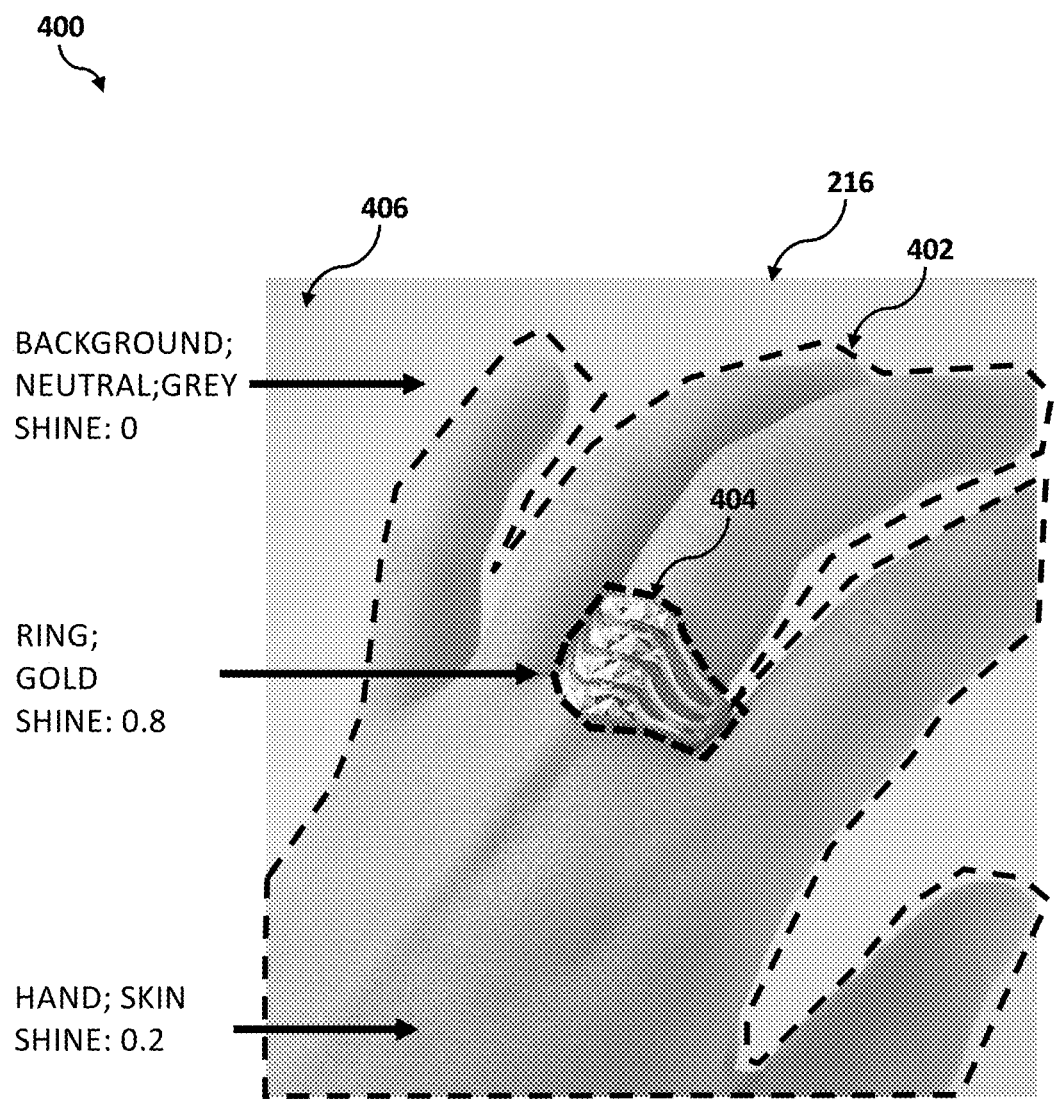
FIG. 4 is a block diagram illustrating a first exemplary event of the shine visualization process according to at least one embodiment.

According to one embodiment, FIG. 4 illustrates an event 400. At event 400, the digital image 216 may be loaded onto a user device and the shine visualization program 110*a*, 110*b* may implement the image recognition module 204 to discover the various elements or objects in digital image 216. In this example, the image recognition module 204 may recognize and label the following three objects in digital image 216: first object 402 (a hand; color "light skin"), second object 404 (a ring-color "gold"), and third object 406 (a background-color "light grey"). As shown in FIG. 4, the image recognition module 204 may also recognize a color and/or material of the recognized objects.

Continuing with event 400, once the various objects in digital image 216 have been detected and recognized, the shine assignment module 206 may determine a corresponding shine index for each object. The shine index of an object may depend on the object's ability to reflect light. As described previously with reference to FIG. 2, the shine visualization program 110*a*, 110*b* may access the object shine index repository 218 to look up the shine index for a corresponding object or material. Based on the object shine index repository 218, the shine assignment module 206 may determine that the shine index of the first object 402 (e.g., hand; skin) is 0.2, the shine index of the second object 402 (e.g., ring; gold) is 0.8, and the shine index of the third object 406 (e.g., background; grey) is 0. In this example, the threshold shine index may be set to 0.1 which may be met by first and second objects 402, 404. Since the first object 406 (e.g. background) is associated with shine=0 (e.g., the object will not shine at all), the shine visualization program 110*a*, 110*b* may not process the third object 406 for simulating the shining effect. Further processing may be continued with the first and second objects 402, 404.

Figure 5:
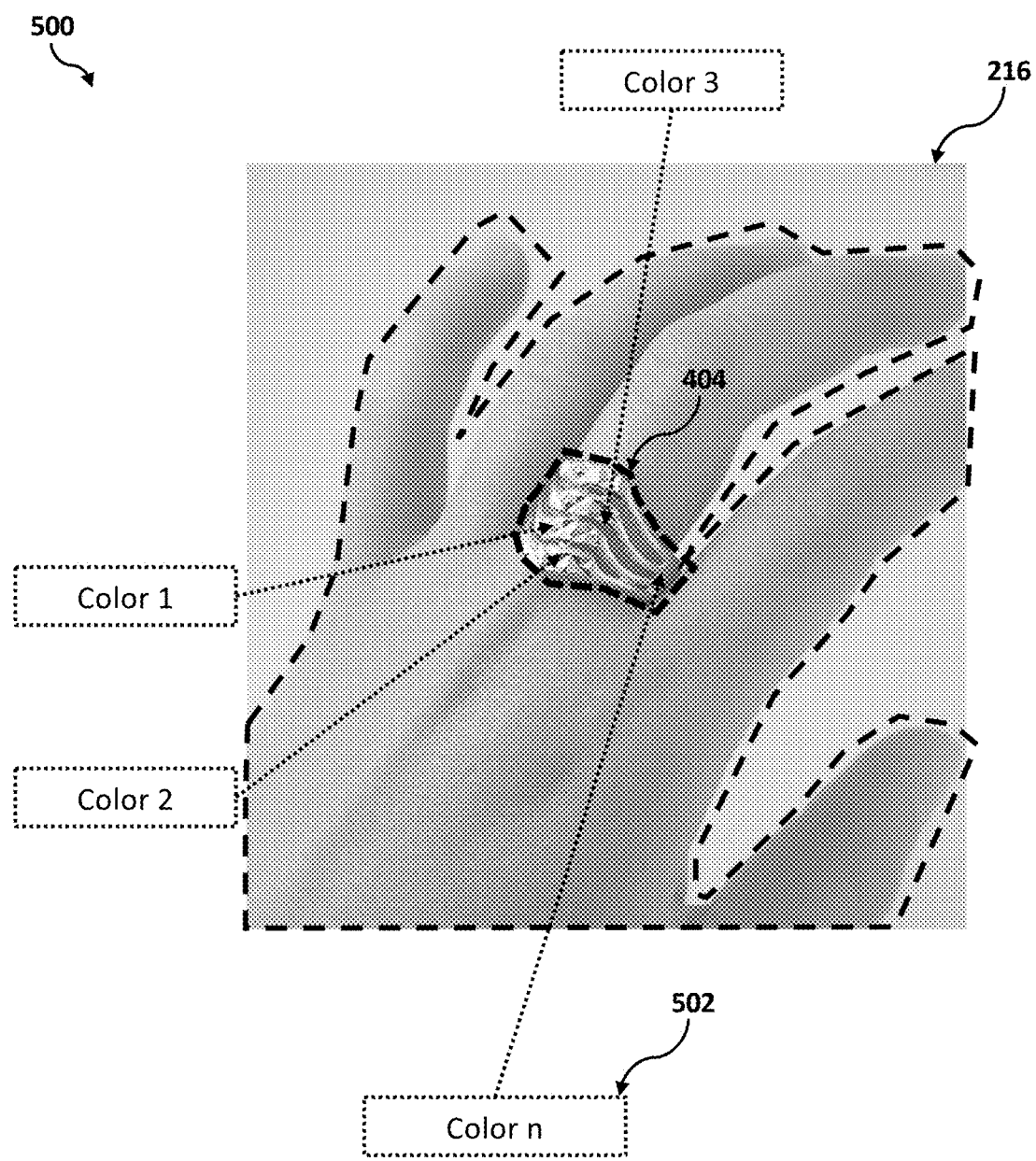
FIG. 5 is a block diagram illustrating a second exemplary event of the shine visualization process according to at least one embodiment.

According to one embodiment, FIG. 5 illustrates an event 500. At event 500, the color extraction module 208 may measure and compare the pixel values corresponding to second object 404 to detect tonal variations in the color of the object. In one embodiment, the color extraction module 208 may detect any number of tonal variations 502 of each object.

Figure 6:
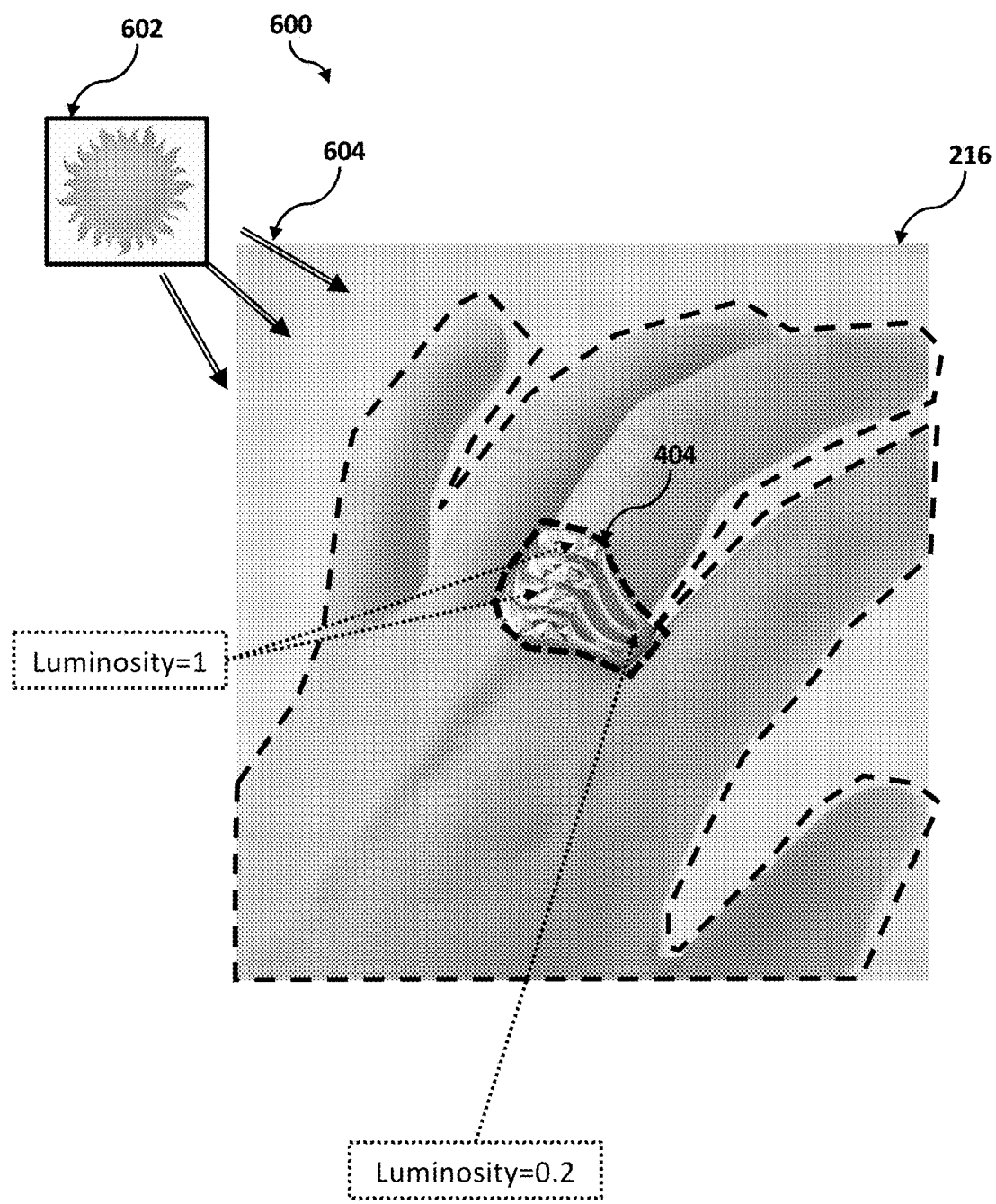
FIG. 6 is a block diagram illustrating a third exemplary event of the shine visualization process according to at least one embodiment.

According to one embodiment, FIG. 6 illustrates an event 600. At event 600, the light detection module 210 may use the tonal variations determined by the color extraction module 208 at event 500 to calculate one or more luminosity levels for second object 404. As described previously, the luminosity may refer to a measure of the amount of light falling on a surface of an object. In this example, the luminosity may indicate a relative value (e.g., relative luminosity) in a range from 0 to 1. At event 600, the light detection module 210 may calculate two luminosity levels for the second object 404, where a surface of the object which receives the most amount of light may include the highest luminosity level (e.g., luminosity=1) and the surface of the object which receives the least amount of light may include the lowest luminosity level (e.g., luminosity=0.2). Based on these luminosity levels, the light detection module 210 may determine that a location 602 of a light source and a direction of light 604 is on the side of the object with the highest luminosity level (e.g., luminosity=1).

Figure 7:
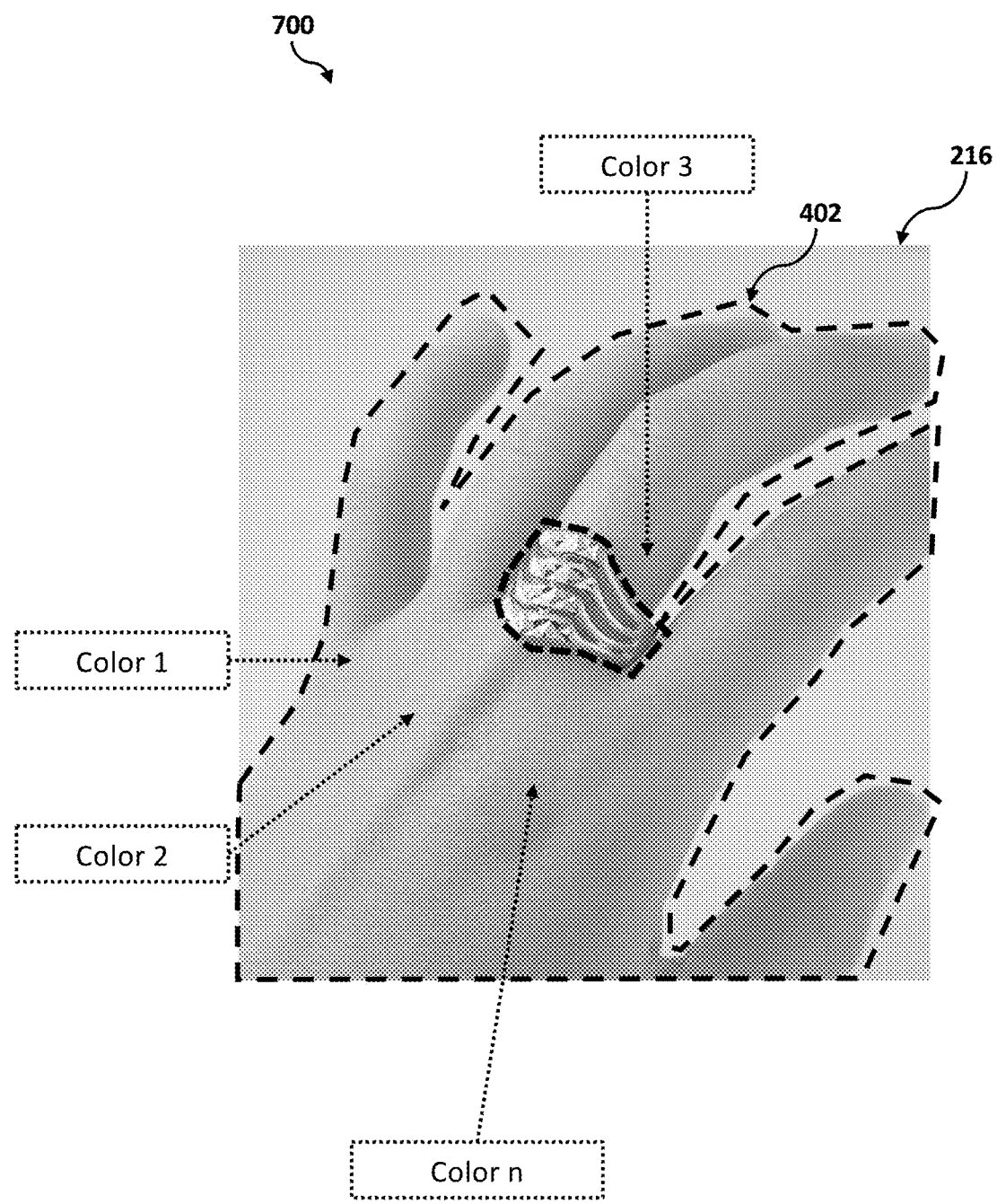
FIG. 7 is a block diagram illustrating a fourth exemplary event of the shine visualization process according to at least one embodiment.

According to one embodiment, FIG. 7 illustrates an event 700. Similar to event 500, at event 700, the color extraction module 208 may measure and compare the pixel values corresponding to first object 402 to detect tonal variations in the color of the object.

Figure 8:
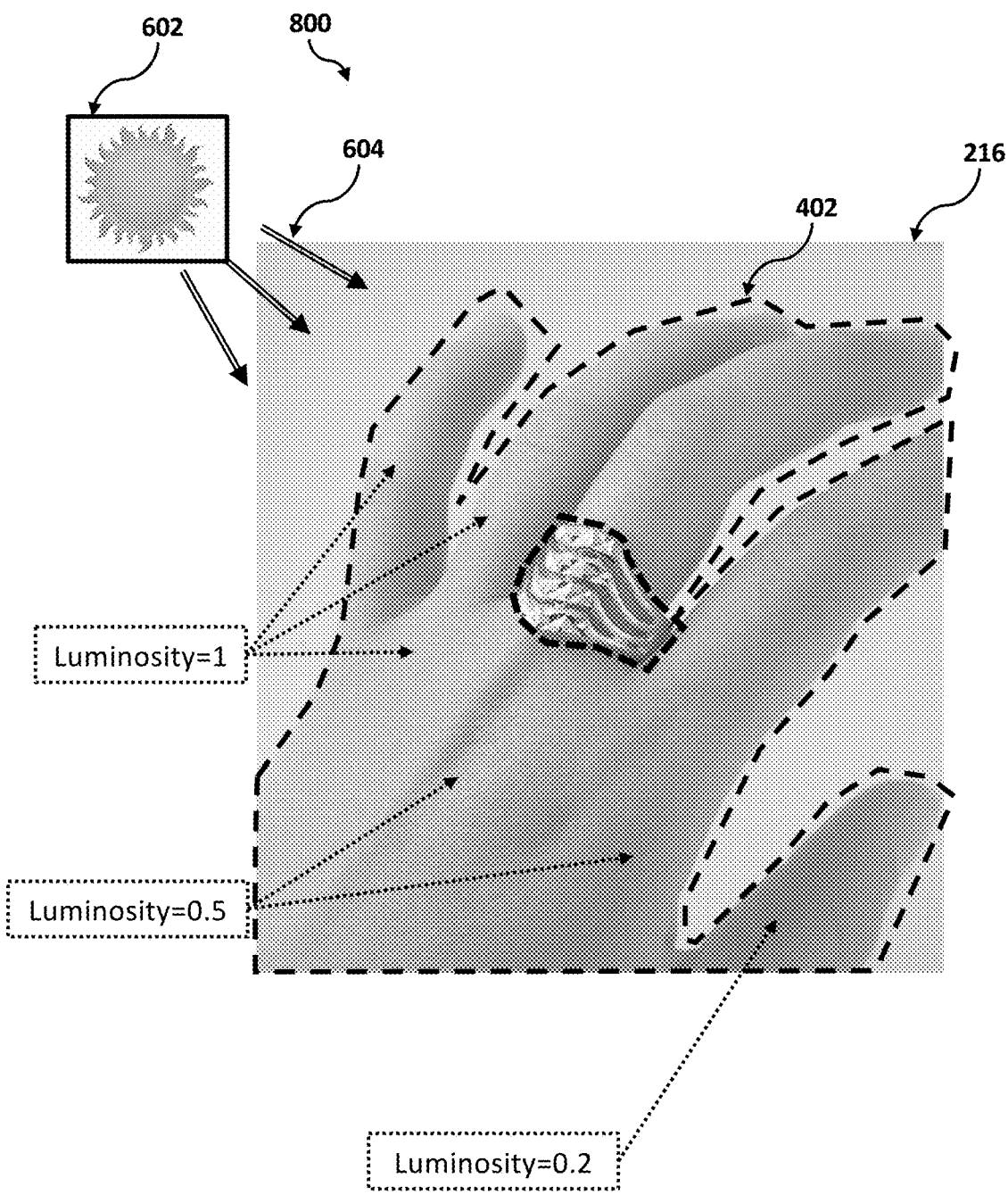
FIG. 8 is a block diagram illustrating a fifth exemplary event of the shine visualization process according to at least one embodiment.

According to one embodiment, FIG. 8 illustrates an event 800. Similar to event 600, at event 800, the light detection module 210 may use the tonal variations determined by the color extraction module 208 at event 700 to calculate one or more luminosity levels for first object 402. At event 800, the light detection module 210 may calculate three luminosity levels for the first object 402, where a surface of the object which receives the most amount of light may include the highest luminosity level (e.g., luminosity=1), the surface of the object which receives the least amount of light may include the lowest luminosity level (e.g., luminosity=0.2), and the surface of the object which receives an intermediate amount of light may include an intermediate luminosity level (e.g., luminosity=0.5). Based on these luminosity levels, the light detection module 210 may maintain its determination (e.g., from event 600) that the light source is at the location 602 and the direction 604 of the light is on the side of the object with the highest luminosity level (e.g., luminosity=1).

Figure 9:
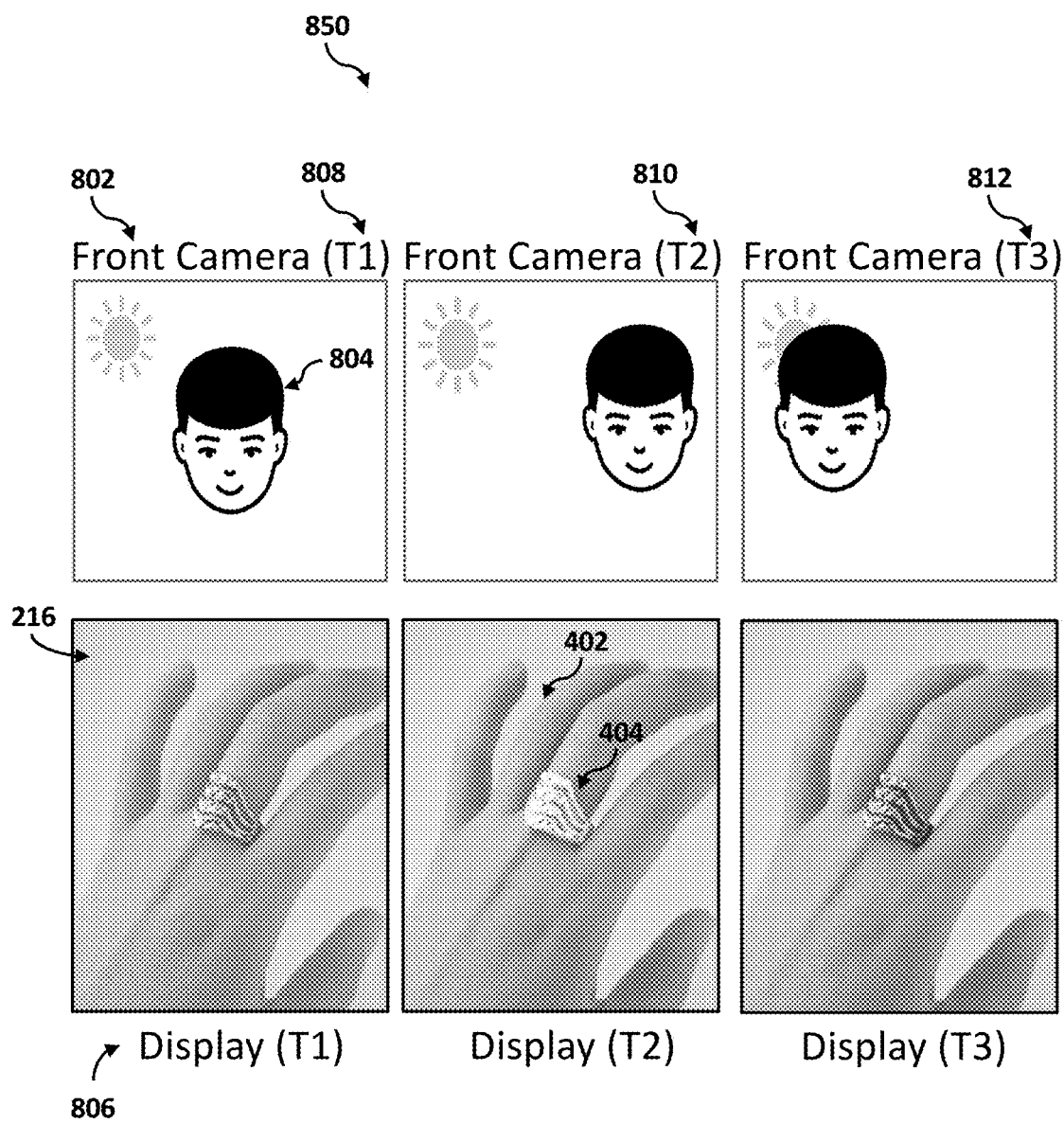
FIG. 9 is a block diagram illustrating a sixth exemplary event of the shine visualization process according to at least one embodiment.

According to one embodiment, FIG. 9 illustrates an event 850. At event 850, the shine visualization program 110*a*, 110*b* may implement the motion detection module 212 to interact with a camera 802 of the user device to track any movements of a user 804 viewing the digital image 216 on user device display 806.

If the user 804 is stable (e.g., does not move), such as, for example, at time 1 (T1)-808, the image rendering module 214 of the shine visualization program 110*a*, 110*b* may render a default (e.g., original) version of the digital image 216 on user device display 806.

If the user 804 moves their head to the left relative to the camera 802, such as, for example, at time 2 (T2)-810, the image rendering module 214 may be implemented to apply one or more filters in real-time to increase the brightness of the first and second objects 402, 404 to simulate an increased mirror effect with the light source. As described previously, the image rendering module 214 may use the shine index assigned to the first and second objects 402, 404 as a multiplier with the filters. Accordingly, since the second object 404 included a shine index of 0.8, the image rendering module 214 may apply the filters more intensively on the pixels of the second object 404 relative to the first object 402 which had a shine index of 0.2.

Thereafter, if the user 804 moves their head to the right relative to the camera 802, such as, for example, at time 3 (T3)-812, the image rendering module 214 may be implemented to apply one or more filters in real-time to decrease the brightness of the first and second objects 402, 404.

The shine visualization program 110*a*, 110*b* may improve the functionality of a computer because shine visualization program 110*a*, 110*b* may enable a computer to detect if a user viewing a digital image on the computer (with a camera) is moving and to simulate the shining effect of an object in the digital image if movement is detected. Accordingly, the shine visualization program 110*a*, 110*b* may enhance user experience and provide more information to a user interacting with a digital image on a computer.

It may be appreciated that FIGS. 2 to 9 provide only an illustration of one embodiment and do not imply any limitations with regard to how different embodiments may be implemented. Many modifications to the depicted embodiment(s) may be made based on design and implementation requirements.

Figure 10:
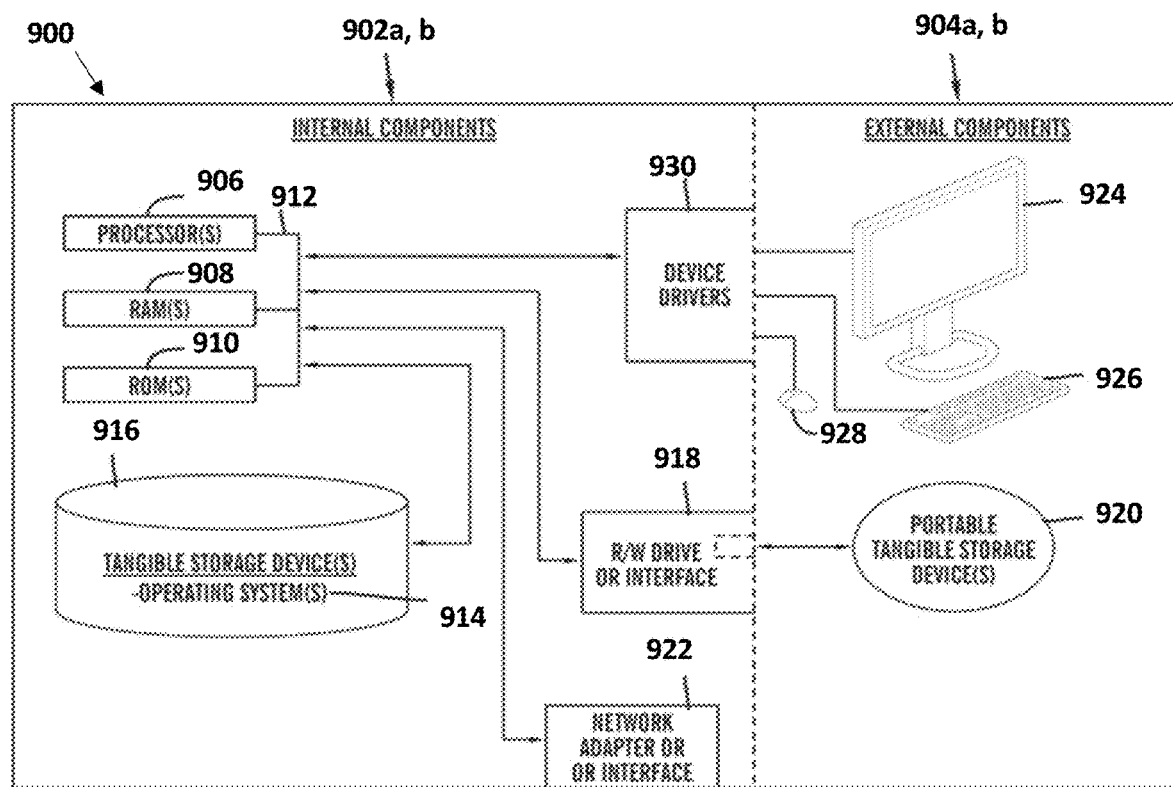
FIG. 10 is a block diagram of internal and external components of computers and servers depicted in FIG. 1 according to at least one embodiment.

FIG. 10 is a block diagram 900 of internal and external components of computers depicted in FIG. 1 in accordance with an illustrative embodiment of the present invention. It should be appreciated that FIG. 10 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 10. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the shine visualization program 110a in client computer 102, and the shine visualization program 110b in network server 112, may be stored on one or more computer-readable tangible storage devices 916 for execution by one or more processors 906 via one or more RAMs 908 (which typically include cache memory). In the embodiment illustrated in FIG. 10, each of the computer-readable tangible storage devices 916 is a magnetic disk storage device of an internal hard drive. Alternatively, each of the computer-readable tangible storage devices 916 is a semi-conductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the shine visualization program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the shine visualization program 110a in client computer 102 and the shine visualization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the shine visualization program 110a in client computer 102 and the shine visualization program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
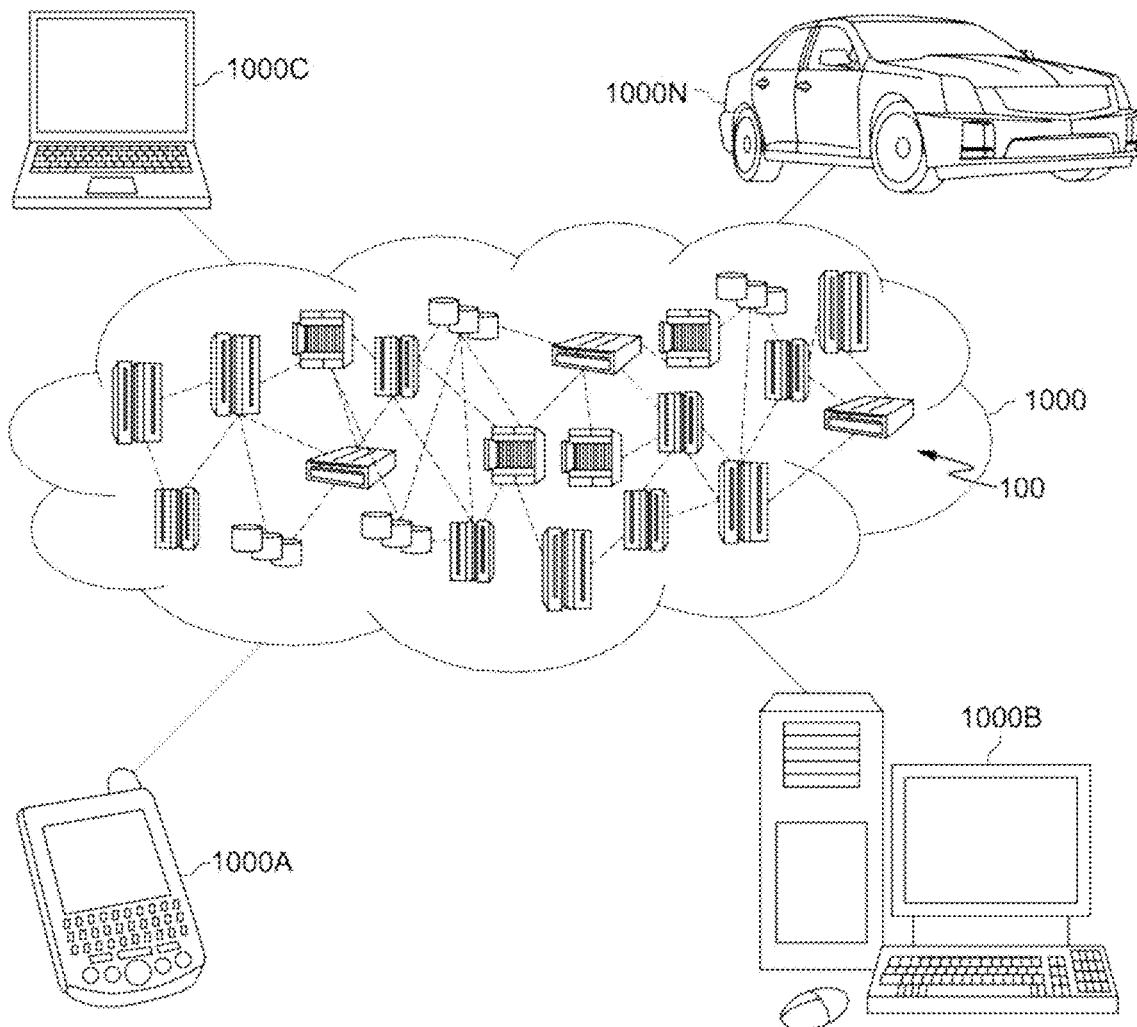
FIG. 11 is a block diagram of an illustrative cloud computing environment including the computer system depicted in FIG. 1, in accordance with an embodiment of the present disclosure.

Referring now to FIG. 11, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 11 are intended to be illustrative only and that computing nodes 100 and cloud computing environment 1000 can communicate with any type of computerized device over any type of network and/or network addressable connection (e.g., using a web browser).

Figure 12:
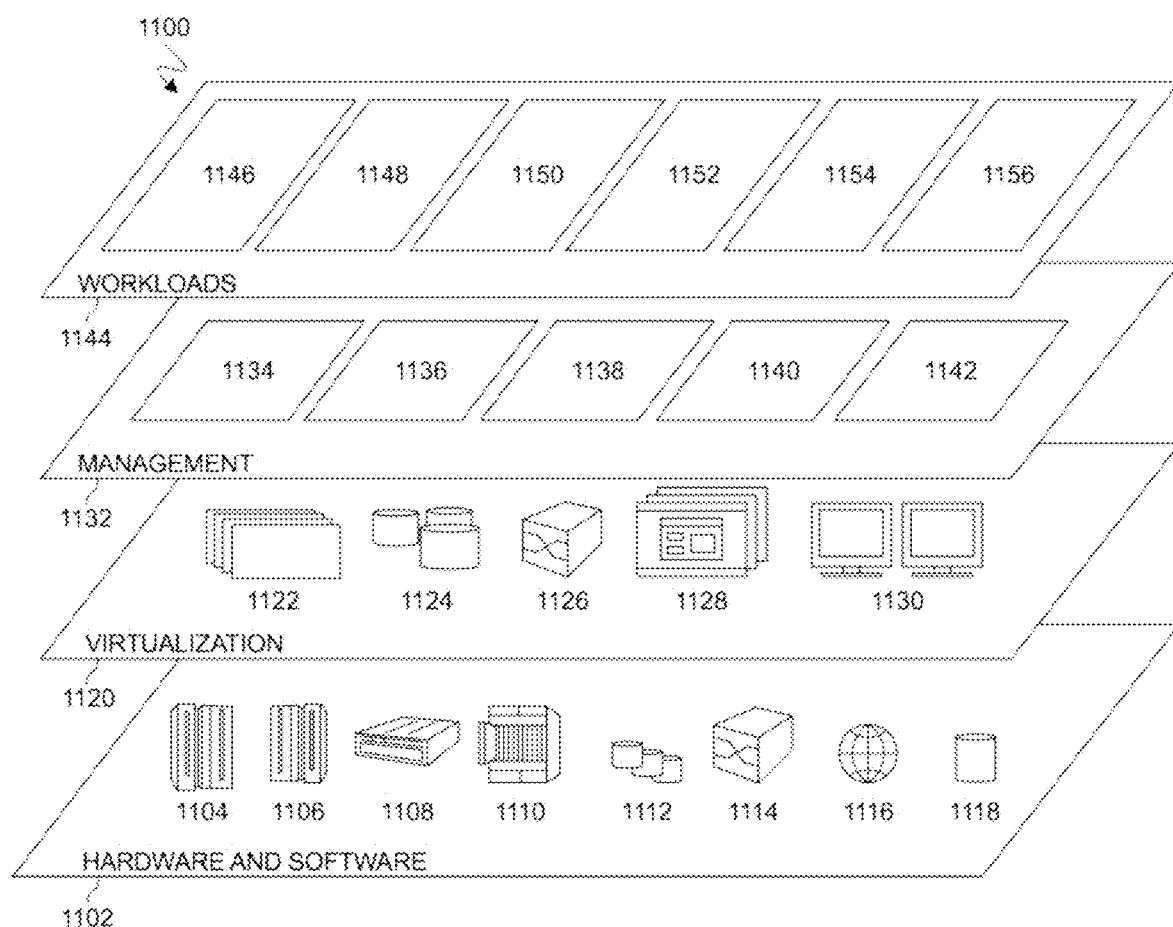
FIG. 12 is a block diagram of functional layers of the illustrative cloud computing environment of FIG. 11, in accordance with an embodiment of the present disclosure.

Referring now to FIG. 12, a set of functional abstraction layers 1100 provided by cloud computing environment 1000 is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and shine visualization 1156. A shine visualization program 110a, 110b provides a way to animate a static digital image to simulate a shining effect on an image object.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
recognizing, using a user device, at least one object in a digital image loaded on the user device;
assigning, using the user device, a shine index to the recognized at least one object, wherein the assigned shine index is retrieved from a shine index repository;
determining, using the user device, based on a plurality of pixel values corresponding to the recognized at least one object, a direction of light relative to the recognized at least one object;
tracking, using a camera associated with the user device, a position of a user's eyes viewing the digital image on the user device; and
in response to detecting a movement in the position of the user's eyes using the camera associated with the user device, applying, in real-time, using the user device, at least one filter to the recognized at least one object to simulate a shining effect of the recognized at least one object in the digital image.

2. The method of claim 1, further comprising:
in response to the assigned shine index associated with the recognized at least one object meeting a threshold shine index, further processing the recognized at least one object for simulating the shining effect of the recognized at least one object in the digital image.

3. The method of claim 1, further comprising:
in response to the assigned shine index associated with the recognized at least one object falling below a threshold shine index, displaying an original version of the recognized at least one object in the digital image.

4. The method of claim 1, further comprising:
comparing the plurality of pixel values corresponding to the recognized at least one object; and
detecting at least one tonal variation in the compared plurality of pixel values, wherein the detected at least one tonal variation is associated with a light reflecting from the recognized at least one object.

5. The method of claim 4, further comprising:
calculating at least one luminosity level associated with the recognized at least one object based on the detected at least one tonal variation in the compared plurality of pixel values.

6. The method of claim 1, further comprising:
calculating, based on the plurality of pixel values corresponding to the recognized at least one object, a luminosity gradient associated with the recognized at least one object, wherein the calculated luminosity gradient includes a highest luminosity level and a lowest luminosity level; and
determining that the direction of the light is on a side of the recognized at least one object with the highest luminosity level.

7. The method of claim 1, further comprising:
utilizing the assigned shine index as a multiplier with the applied at least one filter, wherein a higher shine index may increase an intensity of the applied at least one filter.

8. A computer system for shine visualization, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
recognizing at least one object in a digital image loaded on a user device;
assigning a shine index to the recognized at least one object;
determining, based on a plurality of pixel values corresponding to the recognized at least one object, a direction of light relative to the recognized at least one object;
tracking a position of a user's eyes viewing the digital image on the user device; and
in response to detecting a movement in the position of the user's eyes, applying, in real-time, at least one filter to the recognized at least one object to simulate a shining effect of the recognized at least one object in the digital image.

9. The computer system of claim 8, further comprising:
in response to the assigned shine index associated with the recognized at least one object meeting a threshold shine index, further processing the recognized at least one object for simulating the shining effect of the recognized at least one object in the digital image.

10. The computer system of claim 8, further comprising:
in response to the assigned shine index associated with the recognized at least one object falling below a threshold shine index, displaying an original version of the recognized at least one object in the digital image.

11. The computer system of claim 8, further comprising:
comparing the plurality of pixel values corresponding to the recognized at least one object; and
detecting at least one tonal variation in the compared plurality of pixel values, wherein the detected at least one tonal variation is associated with a light reflecting from the recognized at least one object.

12. The computer system of claim 11, further comprising:
calculating at least one luminosity level associated with the recognized at least one object based on the detected at least one tonal variation in the compared plurality of pixel values.

13. The computer system of claim 8, further comprising:
calculating, based on the plurality of pixel values corresponding to the recognized at least one object, a luminosity gradient associated with the recognized at least one object, wherein the calculated luminosity gradient includes a highest luminosity level and a lowest luminosity level; and
determining that the direction of the light is on a side of the recognized at least one object with the highest luminosity level.

14. The computer system of claim 8, further comprising:
utilizing the assigned shine index as a multiplier with the applied at least one filter, wherein a higher shine index may increase an intensity of the applied at least one filter.

15. A computer program product for shine visualization, comprising:
one or more computer-readable storage media and program instructions collectively stored on the one or more computer-readable storage media, the program instructions executable by a processor to cause the processor to perform a method comprising:
recognizing at least one object in a digital image loaded on a user device;

assigning a shine index to the recognized at least one object;

determining, based on a plurality of pixel values corresponding to the recognized at least one object, a direction of light relative to the recognized at least one object;

tracking a position of a user's eyes viewing the digital image on the user device; and in response to detecting a movement in the position of the user's eyes, applying, in real-time, at least one filter to the recognized at least one object to simulate a shining effect of the recognized at least one object in the digital image.

16. The computer program product of claim 15, further comprising:

in response to the assigned shine index associated with the recognized at least one object meeting a threshold shine index, further processing the recognized at least one object for simulating the shining effect of the recognized at least one object in the digital image.

17. The computer program product of claim 15, further comprising:

in response to the assigned shine index associated with the recognized at least one object falling below a threshold shine index, displaying an original version of the recognized at least one object in the digital image.

18. The computer program product of claim 15, further comprising:

comparing the plurality of pixel values corresponding to the recognized at least one object; and detecting at least one tonal variation in the compared plurality of pixel values, wherein the detected at least one tonal variation is associated with a light reflecting from the recognized at least one object.

19. The computer program product of claim 18, further comprising:

calculating at least one luminosity level associated with the recognized at least one object based on the detected at least one tonal variation in the compared plurality of pixel values.

20. The computer program product of claim 15, further comprising:

calculating, based on the plurality of pixel values corresponding to the recognized at least one object, a luminosity gradient associated with the recognized at least one object, wherein the calculated luminosity gradient includes a highest luminosity level and a lowest luminosity level; and determining that the direction of the light is on a side of the recognized at least one object with the highest luminosity level.

* * * * *